Patented Aug. 13, 1940

2,211,442

UNITED STATES PATENT OFFICE 2,211,442

LUBRICANT

Erich M. Steffen, Berlin, Germany, assignor, by mesne assignments, of three-fourths to Tide Water Associated Oil Company, New York, N. Y., a corporation of Delaware No Drawing. Application September 15, 1936, Serial No. 100,820. Renewed January 24, 1940

12 Claims. (Cl. 87—9)

This invention relates to lubricants, and more particularly is concerned with certain synthetic compositions of matter formed by the catalytic conversion of rubber and which are effective to impart valuable and desired characteristics to lubricating oils when blended therewith.

In my co-pending application, Serial No. 683,169, now issued as Patent No. 2,142,219 of January 3, 1939, filed August 1, 1933, for Lubricants, it is shown that the treatment of rubber material with a catalyst such as anhydrous aluminium chloride produces stable conversion products which are exceedingly valuable in the production of high grade lubricating oils. Therein, it is also shown that such a catalytic conversion of rubber advantageously may be effected in the presence of chlorinated hydrocarbons, such as chlorinated mineral oil, selected chlorinated mineral oil fractions, or specific halogenated hydrocarbons of which ethylene dichloride may be cited as a convenient example. In the co-pending application, Serial No. 26,616, filed June 14, 1935, by me jointly with John E. Schott, now issued at Patent No. 2,142,220 of January 3, 1939, there is disclosed and claimed broadly the improvement in such compositions and their preparation which flows from the presence during the rubber conversion reaction of unsaturated compounds such as the olefines, di-olefines, and those hydrocarbons of an aromatic nature which are similarly reactive in the presence of anhydrous aluminum chloride to form more stable conversion products. Polymer gasoline or fractions thereof may be used as additional material in the presence of which the anhydrous aluminum chloride conversion of rubber may be effected.

The synthetic compositions of matter produced in the foregoing operations proved generally valuable as blending agents for hydrocarbon oils, and exhibited particular utility in the production of lubricating compositions having desired properties of low pour point and high viscosity index. It is an important object of the present invention to provide improvements in the formation of compositions of this character to the end that the production thereof may be facilitated. A particular object resides in the use of an improved catalyst.

I have now discovered that the general reaction comprising the anhydrous aluminum chloride conversion of rubber material, whether per se or in the presence of added material such as chlorinated hydrocarbons, unsaturated and like hydrocarbons generally, and polymer gasoline specifically, may be simplified in operation and rendered more readily controllable by effecting the said reaction by means of a mixed catalyst in place of straight anhydrous aluminum chloride.

The mixed catalyst which I use in my improved catalytic rubber conversion operation comprises an intimate mixture of anhydrous aluminum chloride with finely divided or comminuted metal, in particular iron preferably in powder-like or dust-like form. The iron apparently need not be of extreme chemical purity, that is normal proportions of impurities such as oxides or other metals may be present, but such other elements as are contained in iron intended for use in my mixed catalyst should be limited in total quantity to amounts ordinarily regarded as impurities, for example not substantially in excess of 5%–10% based on the weight of the iron.

Insofar as I am aware, the use of a mixed catalyst comprising anhydrous aluminum chloride and a metal in my rubber conversion reaction does not extend broadly to all metals. Thus, I have found by experiment that finely divided metallic aluminum or a mixture of finely divided metallic copper and metallic zinc are not desirable for use according to the invention since the presence of these metals seems to have the effect of unduly reducing the effectiveness of the rubber conversion products as addition agents for mineral hydrocarbon oils; the products resulting from conversions of rubber in these latter instances being markedly inferior in pour point lowering effect upon mineral lubricating oils.

In further more specific illustration of the practice of the present invention, the following examples of the production of synthetic compositions having pour point lowering properties are given. It will be understood, of course, that the particularized steps, proportions, and reacting ingredients other than catalyst are given by way of illustration and not by way of limitation since the discovery underlying the present invention has proved applicable to various modifications of the general rubber conversion reaction broadly disclosed and claimed in my aforesaid co-pending application, Serial No. 683,169 now issued as Patent No. 2,142,219 of January 3, 1939.

*Example I*

Rubber (40 grams in finely divided state), solvent naphtha (approximately 500 ccs.), and polymer gasoline (750 ccs. of a 62.7° A. P. I. product having a boiling range of 90° F. to 437° F. with a content of unsaturates and aromatics totalling over 50% and produced by thermal polymerization of cracked gases) are intimately admixed with agitation and heated at about 160° F. for sufficient time to occasion perfect gel formation. In this case, the vessel in which the rubber gel is formed preferably communicates with a condenser for receiving and collecting the lighter fractions present which boil below 160° F. and therefore pass overhead. This is unnecessary, of course, when the various ingredients all boil above the temperature at which the mixture is heated.

Meanwhile, the mixed catalyst of the invention is prepared by intimately mixing 18 grams of anhydrous aluminum chloride and 20 grams of finely divided metallic iron. With the rubber-solvent gel still at the formation temperature of about 160° F., a 7 gram portion of the mixed catalyst is added thereto with agitation, whereupon an immediate reaction is evidenced by liquifaction of the gel and an increase in the reaction mixture temperature to 178° F. without further external application of heat. Within a few minutes, a further portion of catalyst in the amount of 4 grams is added and continued progress of the reaction is evidenced by an increase in temperature to 194° F. After an additional few minutes of reaction at this temperature, the remaining portion of the catalyst comprising 27 grams is added to the reaction mixture which thereafter shortly rises in temperature to 221° F. The reaction is complete within 1 to 1¼ hours from the time of first catalyst addition; and the mixture then is cooled to between 150° F. and 160° F., washed with an alcoholic caustic solution (1 part ethyl alcohol—1 part 25% aq. NaOH solution), and allowed to settle for a short period. A bright, clear, red solution is obtained which, after separation from a relatively small amount of sludge sedimentation, is reduced by steam distillation to yield 94 grams of a yellow-red resin having pronounced utility as an addition or blending agent for mineral lubricating oils. Thus, 1% by weight added to certain oils gave the following results:

|  | Original neutral oil | Oil+1% product |
| --- | --- | --- |
| Gravity, °A. P. I. | 30.2 | 29.8 |
| Saybolt vis. @ 100° F. | 187 | 207 |
| Saybolt vis. @ 210° F. | 47 | 48 |
| Pour point, °F. | 25 | −10 |

|  | Original blended motor oil | Oil+1% product |
| --- | --- | --- |
| Gravity, °A. P. I. | 28.1 | 28 |
| Saybolt vis. @ 100° F. | 490 | 564 |
| Saybolt vis. @ 210° F. | 65 | 69 |
| Pour point, °F. | 20 | −5 |

*Example II*

Rubber (40 grams in finely divided state), solvent naphtha (approximately 500 ccs.), polymer gasoline (350 ccs. of a fraction boiling above 200° F., the original being the same as in Example I) and cresol (1 cc.) are intimately admixed with agitation and heated to about 175° F. for sufficient time to occasion perfect gel formation.

Meanwhile, the mixed catalyst of the invention is prepared by intimately mixing 18 grams of anhydrous aluminum chloride and 18 grams of finely divided metallic iron. With the rubber-solvent gel still at the formation temperature of about 175° F., an 18 gram portion (i. e., one-half of the total used) of the mixed catalyst is added thereto with agitation, no further external application of heat. An immediate reaction is evidenced by liquefaction of the gel and an increase in the reaction mixture temperature to 194° F. Within about 10 minutes, the remaining 18 gram portion of the mixed catalyst is added and continued reaction effects an increase in reaction mixture temperature to 221° F. The overall time for completion of the desired conversion reactions is somewhat under 1 hour from the time of first catalyst addition; and the mixture then is cooled to about 120° F.–125° F., washed with an alcoholic caustic solution (1 part ethyl alcohol—1 part 25% NaOH solution), and allowed to settle for a short period. A bright, clear, red solution is obtained which, after separation from a relatively small amount of settled sludge, is reduced by steam distillation to yield 86 grams of a red resin having pronounced utility as an addition or blending agent for mineral lubricating oils. Thus, 1% by weight added to certain oils gave the following results:

|  | Original neutral oil | Oil+1% product |
| --- | --- | --- |
| Gravity, °A. P. I. | 30.2 | 29.7 |
| Saybolt vis. @ 100°F. | 187 | 210 |
| Saybolt vis. @ 210°F. | 47 | 52 |
| Pour point, °F. | 25 | Below −10 |

|  | Original blended motor oil | Oil+1% product |
| --- | --- | --- |
| Gravity, °A. P. I. | 28.1 | 28.0 |
| Saybolt vis. @ 100°F. | 490 | 551 |
| Saybolt vis. @ 210°F. | 65 | 68 |
| Pour point, °F. | 20 | Below −10 |

Various advantages attend the practice of my present invention as compared with methods using straight anhydrous aluminum chloride as a catalyst for the rubber conversion reaction. Smaller proportions of aluminum chloride relative to polymerizable ingredients may be used, and this is desirable to the end of minimizing possibilities of excessive catalytic action resulting in partial depolymerization of the desired high molecular weight compounds first formed. The reaction is fully self-sustaining with respect to heat requirements, thus enhancing its practical aspect. At the same time, overall reaction period is short which is a factor of value in large scale production.

In the foregoing illustrative examples, equal or nearly equal proportions by weight of anhydrous aluminum chloride and of finely divided metallic iron are used. The invention is not limited to these proportions, however, both larger and smaller amounts of iron being useful. In general, it is desirable to use minimum amounts of aluminum chloride, but optimum proportions will depend, among other things, upon such factors as the initial temperature at which catalyst is introduced into the reaction mixture, the quantity, character, and relative proportions of the reaction mixture ingredients including rubber, and the like, for any given set of conditions.

Likewise, it is not necessary that the rubber conversion be effected in the presence of polymer gasoline, the invention being practiced with equal utility in the straight conversion of rubber per se, or in the conversion of rubber in the presence of other materials such as chlorinated hydrocarbons, or those hydrocarbons, of a generally unsaturated nature which have a capacity for undergoing chemical change to more stable form when reactively contacted with a catalyst having the effect of anhydrous aluminum chloride.

In the matter of catalyst addition according to the present invention, I have found it beneficial to practice a portion-wise introduction into the reaction mixture in successive steps, as is illustrated in the examples given above. This method of operation seems to be attended by operating advantages such as facility of handling the mixture during reaction, but it is not essential to successful operation that this exact practice be observed.

I claim:

1. The method of preparing synthetic compositions useful for blending with lubricating oils, which comprises subjecting rubber material to the action of anhydrous aluminum chloride in the presence of metallic iron under conditions effective to produce conversion products.

2. The method of preparing synthetic compositions useful for blending with lubricating oils, which comprises subjecting rubber material and chlorinated hydrocarbons to the action of anhydrous aluminum chloride in the presence of metallic iron under conditions effective to produce conversion products.

3. The method of preparing synthetic compositions useful for blending with lubricating oils, which comprises subjecting rubber material together with at least one other hydrocarbon to the action of anhydrous aluminum chloride in the presence of metallic iron under conditions effective to produce conversion products, said other hydrocarbons including at least one which has a capacity for undergoing chemical change to more stable form when reactively contacted with aluminum chloride.

4. The method of preparing synthetic compositions useful for blending with lubricating oils, which comprises subjecting rubber material and polymer gasoline to the action of anhydrous aluminum chloride in the presence of metallic iron under conditions effective to produce conversion products.

5. Stable, synthetic compositions characterized by the property of reducing the pour point of wax-containing hydrocarbon oils when blended therewith comprising products obtained by subjecting rubber material to the action of anhydrous aluminum chloride in the presence of metallic iron under conditions effective to produce conversion products.

6. Stable, synthetic compositions characterized by the property of reducing the pour point of wax-containing hydrocarbon oils when blended therewith comprising products obtained by subjecting rubber material together with other hydrocarbons, at least one of which is characterized by a capacity for undergoing chemical change to more stable form when reactively contacted with aluminum chloride, to the action of anhydrous aluminum chloride in the presence of metallic iron under conditions effective to produce conversion products.

7. Stable, synthetic compositions characterized by the property of reducing the pour point of wax-containing hydrocarbon oils when blended therewith comprising products obtained by subjecting rubber material and chlorinated hydrocarbons to the action of anhydrous aluminum chloride in the presence of metallic iron under conditions effective to produce conversion products.

8. Stable, synthetic compositions characterized by the property of reducing the pour point of wax-containing hydrocarbon oils when blended therewith comprising products obtained by subjecting rubber material and polymer gasoline to the action of anhydrous aluminum chloride in the presence of metallic iron under conditions effective to produce conversion products.

9. An improved lubricant having as a major constituent a viscous hydrocarbon oil and containing, in relatively minor proportion based on the amount of said oil, a synthetic composition characterized by its effectiveness in lowering the pour point of wax-containing hydrocarbon oils and comprising the product obtained by subjecting rubber to the action of anhydrous aluminum chloride in the presence of metallic iron under conditions effective to produce conversion products.

10. The method of preparing lubricants, which comprises subjecting rubber material to the action of anhydrous aluminum chloride in the presence of metallic iron under conditions effective to produce conversion products, recovering stable, synthetic compositions having pour point lowering properties, and blending such compositions with viscous hydrocarbon oil in relatively minor proportion.

11. The method of preparing synthetic compositions useful for blending with lubricating oils, which comprises subjecting rubber material to the action of a catalyst of the type exemplified by anhydrous aluminum chloride, in the presence of metallic iron, under conditions effective to produce conversion products.

12. The method of preparing synthetic compositions useful for blending with lubricating oils, which comprises subjecting rubber material in a dissolved phase to the action of a catalyst of the type exemplified by anhydrous aluminum chloride, in the presence of metallic iron, under conditions effective to produce conversion products.

ERICH M. STEFFEN.